US006978273B1

(12) United States Patent
Bonneau et al.

(10) Patent No.: US 6,978,273 B1
(45) Date of Patent: Dec. 20, 2005

(54) RULES BASED CUSTOM CATALOGS GENERATED FROM A CENTRAL CATALOG DATABASE FOR MULTIPLE ENTITIES

(75) Inventors: Scott Bonneau, Austin, TX (US); Michael Nonemacher, Austin, TX (US); Jeremy Weinrib, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 536 days.

(21) Appl. No.: 09/884,216

(22) Filed: Jun. 18, 2001

(51) Int. Cl.⁷ .......................................... G06F 17/30
(52) U.S. Cl. ...................... 707/102; 707/3; 707/10; 707/101; 707/103; 707/104; 707/6
(58) Field of Search ................. 707/3, 100, 6, 707/10, 102, 101, 103, 104; 705/3, 20, 26, 705/27; 709/202, 229

(56) References Cited

U.S. PATENT DOCUMENTS

| 5,806,066 A | 9/1998 | Golshani et al. ............ 707/100 |
| 5,870,717 A | 2/1999 | Wiecha ........................ 705/26 |
| 5,878,400 A | 3/1999 | Carter, III .................... 705/20 |
| 5,933,599 A | 8/1999 | Nolan .......................... 715/734 |
| 5,970,475 A | 10/1999 | Barnes et al. ................. 705/27 |
| 5,995,939 A | 11/1999 | Berman et al. ................. 705/3 |
| 6,006,216 A | 12/1999 | Griffin et al. .................. 707/2 |
| 6,236,990 B1 | 5/2001 | Geller et al. ................... 707/5 |
| 6,405,197 B2 | 6/2002 | Gilmour ........................ 707/5 |
| 6,442,541 B1 | 8/2002 | Clark et al. .................... 707/3 |
| 6,516,337 B1 * | 2/2003 | Tripp et al. .................. 709/202 |
| 6,542,933 B1 * | 4/2003 | Durst et al. .................. 709/229 |
| 6,578,030 B1 * | 6/2003 | Wilmsen et al. ................ 707/3 |
| 6,772,167 B1 * | 8/2004 | Snavely et al. ............. 707/102 |
| 6,804,662 B1 * | 10/2004 | Annau et al. ................... 707/2 |
| 2002/0138481 A1 * | 9/2002 | Aggarwal et al. .............. 707/6 |
| 2003/0037047 A1 * | 2/2003 | Craig ............................ 707/3 |

OTHER PUBLICATIONS

Aggarwal et al., "Search Product catalogs", US Patent application Publication, Sep. 2002, pp. 1-13.*

* cited by examiner

*Primary Examiner*—Thuy N. Pardo
(74) *Attorney, Agent, or Firm*—Hamilton & Terrile, LLP

(57) ABSTRACT

An arbitrary number of custom catalogs for an arbitrary number of customers can be published from a centrally maintained database of seller catalog data. The custom catalogs are subsets of the catalog database, and are generated in accordance with a set of rules that defines the scope of the content of the custom catalog. The rule sets define a series of sequential searches by which a subset of the item SKUs contained in the database are returned. For extranet buyers, the subsets for each rule set are maintained in a subset table. Whenever a user authorized by a particular buyer wishes to browse the unique catalog subset assigned to that buyer, any queries regarding the catalog will result first in a search of the full catalog database, and the results from the full search are pared down to only those items the SKUs for which have entries in the subset table associated with the buyer's assigned subset. A buyer-authorized user browses the catalog using a standard PC and browser, and SKUs returned to the user based on the user's query will include descriptive information such as descriptive text, pictures etc., which are displayed by the browser. Buyers who are not coupled to the seller via an extranet connection can have customized subsets of the total catalog database produced in accordance with their own rule sets, and formatted and delivered off-line for incorporation into their web sites and procurement networks.

63 Claims, 15 Drawing Sheets

| SKU | ATTID | VAL | PRODTYPE ID |
|---|---|---|---|
| 123 | 1 | COMPAQ | 1 |
| 123 | 2 | 500 MHZ | 1 |
| 123 | 3 | 512K | 1 |
| 123 | 4 | 56K | 1 |
| 321 | 5 | HP | 2 |
| 321 | 6 | COLOR | 2 |
| 321 | 7 | 10PG/MIN | 2 |
| 321 | 8 | 600 DPI | 2 |

*FIG. 3a*

| SKU | ATT#1 | ATT#2 | ATT#3 | ATT#4 |
|---|---|---|---|---|
| 123 | COMPAQ | 500 MHZ | 512 K | 56 K |
| 124 | COMPAQ | 750 MHZ | 1024 K | 56 K |
| 125 | Dell | 500 MHZ | 2048 K | 56 K |

PROD. TYPE = 1 = DESK-TOP COMPUTER

| | ATT#5 | ATT#6 | ATT#7 | ATT#8 |
|---|---|---|---|---|
| 321 | HP | COLOR | 10 PG/MIN | 600 DPI |
| 321 | HP | COLOR | 10 PG/MIN | 300 DPI |

PROD. TYPE = 2 = PRINTER

*FIG. 3b*

| SKU | SUBSET ID |
|---|---|
| 123 | 001 |
| 124 | 001 |
| 123 | 002 |
| 124 | 002 |
| 125 | 002 |
| 123 | 003 |
| 124 | 003 |
| 125 | 003 |
| 321 | 003 |
| 322 | 003 |
| 321 | 004 |
| 322 | 004 |

*FIG. 4*

RULES BASED CUSTOM CATALOGS GENERATED FROM A CENTRAL CATALOG DATABASE FOR MULTIPLE ENTITIES

CROSS REFERENCE TO RELATED APPLICATIONS

This application relates to application Ser. No. 09/884,179, filed on same day herewith, entitled "Rules Based Provision of Custom Pricing for Multiple Entities" and naming Scott Bonneau, Michael Nonemacher and Jeremy Weinrib as inventors, the application being incorporated herein by reference in its entirety.

This application relates to application Ser. No. 09/884,179, filed on same day herewith, entitled "Logical and Constraint Based Browse Hierarchy with Propagation Features" and naming Scott Bonneau, Michael Nonemacher and Jeremy Weinrib as inventors, the application being incorporated herein by reference in its entirety.

This application relates to application Ser. No. 09/884,375, filed on same day herewith, entitled "Browse Hierarchies Customized for Rules Based Custom Catalogs" and naming Scott Bonneau, Michael Nonemacher and Jeremy Weinrib as inventors, the application being incorporated herein by reference in its entirety.

This application relates to application Ser. No. 09/886,691, filed on same day herewith, entitled "A Method For Building Digital Databases Optimized For Maintenance, Descriptiveness, And Fast Search" and naming Scott Bonneau and Michael Nonemacher as inventors, the application being incorporated herein by reference in its entirety.

BACKGROUND OF THE INVENTION

1. Field of the Invention

The present invention relates to the field of on-line catalogs, and more particularly to generating customized versions of an on-line catalog for each of an arbitrary number of different buyers, the customized versions being the results of rules-based searches of a central catalog database maintained by the seller.

2. Description of the Related Art

With the advent of Internet based commerce, organizations on both the buy and sell side of business-to-business (B2B) procurement relationships have sought to harness computer networks as a means for automating the procurement process between them. To facilitate e-commerce, and particularly e-procurement, suppliers of goods and services have developed electronic catalogs by which potential buyers can electronically receive and display information regarding the goods and services offered by the supplier, including descriptive information, pictures and prices.

For many reasons, a seller does not often find it desirable to supply the same catalog to all buyers. It may be preferable for a catalog targeted to businesses to have a different product focus than a catalog for individual consumers, and the scope of products in a catalog may vary from one type of business to another, as well as from one type of consumer to another. For example, the types of computers and peripherals offered to businesses may provide higher performance and as a result are more costly than computer equipment targeted toward consumers. The types of goods and services marketed to one type of business often vary significantly from those targeted toward another type of business. Moreover, buyers that purchase high volumes of products/services will often negotiate unique pricing agreements with sellers that afford significant discounts compared to lower volume purchasers. Thus, it would be highly desirable from the seller's perspective for each buyer or group of buyers to have their own unique catalog, one that is customized to reflect the individual product interests of each customer or customer group, as well their unique business processes and relationships.

For a seller carrying many different items (or providing many classes and types of services), maintaining even one version of an e-catalog can be extremely difficult. To maintain several custom versions of an electronic catalog, a physical manifestation of each custom version is typically created and each version must be maintained and updated as the catalog data changes. Each time a product or service is added, or its attributes or attribute values are changed, every physical manifestation of a version of the catalog must be individually updated to ensure that each version reflects the changes in the catalog data. Each version essentially is obsolete until updated.

Although each version of an electronic catalog is maintained by computer, the fact that an update must be performed for each existing version of the catalog can be time-consuming, labor intensive and prone to error. Moreover, updating multiple versions of the catalog is made even more onerous because they typically reside at different physical locations, to many of which the seller has no direct access. For example, some versions of the catalog may have been published to buyers' proprietary retail web sites, some to public marketplace web sites and still other versions to procurement networks. These common repositories for at least a subset of a seller's catalog information typically are not directly accessible to the seller for making direct updates to the catalog information. Rather, catalog updates for these buyers typically must occur somewhat indirectly and through the cooperation of the buyer. In these contexts, the buyer usually performs the ultimate integration of the custom versions of the catalog into the buyer's web site or procurement network.

Thus, for the seller to provide customized versions of its catalogs to all of its potential customers, prior art techniques have required the seller to assume a tremendous administrative burden to maintain the various versions of its catalog, leading to discrepancies and errors. For example, some versions may continue to include products or services no longer offered by the seller. Another error that can occur is that some of the prices in a version of the catalog have become obsolete. Buyers attempting to purchase products or services still in the catalog but no longer available through the seller will not be happy that they were inconvenienced in such a manner. Obsolete prices can mean lost money to a seller if new higher prices are not reflected by a custom version of the seller's catalog. Thus, trying to maintain and update so many versions of a catalog becomes risky as well as labor-intensive, which tends to offset many of the advantages of providing electronic catalogs.

It would be highly desirable from the seller's perspective if the seller could maintain all catalog data in a central database and in one physical location, and then generate customized versions of its catalogs for its various buyers and buyer groups based on the central database. It would also be preferable if buyers were coupled to the catalog database through a network, so that the seller could present the customized versions of its catalog data to its buyers on a virtual basis, rather than publishing and delivering physical manifestations of the customized versions.

SUMMARY OF THE INVENTION

In one embodiment, the method of generating a plurality of custom catalogs from a central database comprising catalog data generally comprises establishing a plurality of rule sets, each of the rule sets expressing constraints that define a subset of the catalog data comprising one of the custom catalogs, each of the rule sets identified by one of a unique set of rule set identifiers, of executing a search of the central database for each of the rule sets in accordance with the constraints expressed by each rule set, each of the searches returning a set of search results specifying a subset of the catalog data, and of associating each set of rules set search results with the identifier of the rule set used to generate them. In this way, a set of search results is generated for each rule set that can be used to create virtual custom catalogs or physical manifestations thereof.

In one embodiment, the method of generating custom catalogs responds to a database query of an extranet buyer specifying a search of the database of arbitrary scope and associated with one of the rule set identifiers generally by executing a search of the database in accordance with the query, the search returning a set of query results and generating a response to the query that is a subset of the catalog data specified by the intersection between the set of query results and the set of search results associated with the rule set identifier specified by the query. In this way, the extranet buyer has access to a virtual custom catalog that is customized on a query by query basis.

In another embodiment, the method of generating custom catalogs retrieves the catalog data specified by each of the sets of rule set search results, creates a distinct database file consisting of the retrieved catalog data for each, and exports each distinct database file to an entity associated with the identifier of the rule set used to generate the rules set search results. This is one embodiment by which custom catalogs can be generated from the central database and exported to non-extranet buyers.

An embodiment of an apparatus for generating custom catalogs is disclosed that includes a database storage device in which the catalog data is stored, and a database server by which the catalog data is searched and accessed in accordance with the invention. An application server communicates with the database server to initiate the searches, maintain the rules sets and to interact with users through the web server. The web server provides access to the database to users by means of a browser over the Internet.

In another embodiment, the application server executes a series of computer program instructions, which by their execution, performs the method of generating custom catalogs.

BRIEF DESCRIPTION OF THE DRAWINGS

The present invention may be better understood, and its numerous objectives, features and advantages made apparent to those skilled in the art by referencing the accompanying drawings. The use of the same reference number throughout the several figures designates a like or similar element.

FIG. 3a shows an example of how the catalog database is arranged for maintenance.

FIG. 3b shows an example of how a read-only copy of the centralized catalog database of FIG. 3a is arranged during publication of custom versions to facilitate the searches by which the versions can be generated.

FIG. 4 illustrates a subset table generated by the method and apparatus for generating custom catalogs.

DETAILED DESCRIPTION

Overview

Figure 1:
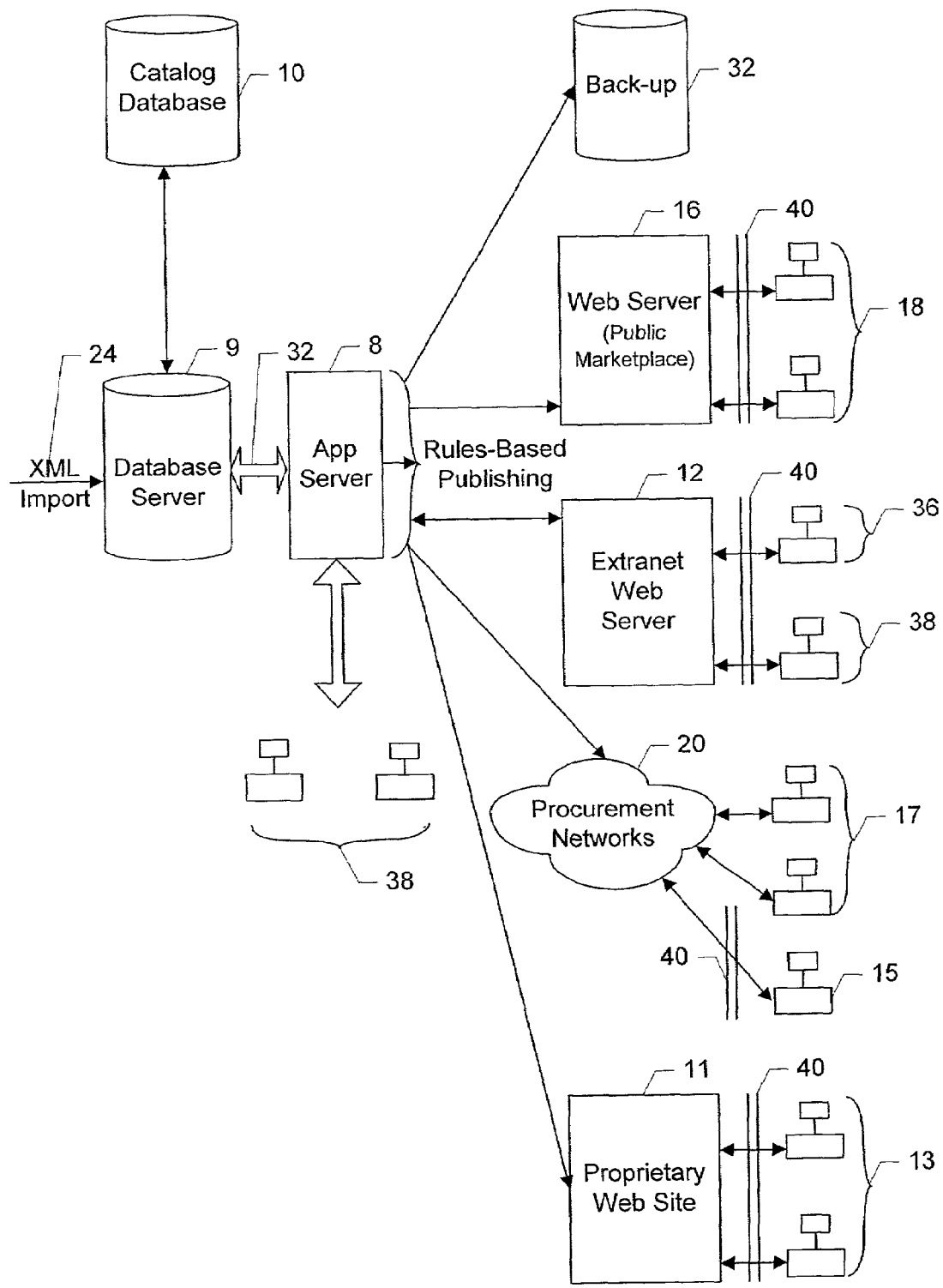
FIG. 1 shows a bock-diagram representation of a general embodiment of the method and apparatus for generating custom catalogs.

One embodiment of the method and apparatus of the invention generates an arbitrary number of customized versions of a seller's catalog for an arbitrary number of buyers or buyer groups from a centrally maintained catalog database consisting of all of the seller's catalog data. The seller's catalog database is centrally managed and maintained. The seller's catalog database consists of data representing some or all of the products or services (i.e. items) offered by the seller. Each item is categorized using a product type having a set of attributes and a unique set of values for those attributes. Each item is identified with a unique SKU, and is represented in the database by its SKU and each of its attribute values. Also associated with each item SKU is descriptive information (e.g. descriptive text, pictures, and the like) normally associated with the display of such items in a catalog.

A buyer's custom version of the seller's catalog consists of a subset of the items in the catalog database, the scope of which has been predefined for each buyer. The scope of each subset of items, and therefore the scope of each custom version of the catalog, is precisely defined by a set of rules that is developed and assigned to each buyer. Each set of rules is associated with a unique identifier, and each buyer is assigned to one set of rules through its associated identifier. Those of skill in the art will recognize that some buyers will have common product or service interests and therefore will share the same customized catalog, and thus will be assigned to the same set of rules by a common identifier. Each set of rules constrains a search of the database based on a product type and a set of attribute values, and when the search is executed returns a set of SKUs from the catalog database. Each SKU number identifies a unique item consisting of a unique set of attribute values.

In one embodiment of the method and apparatus for generating custom catalogs, the seller performs a virtual publication process on a regularly scheduled basis to update all of the custom versions of the catalogs to reflect any changes made to the catalog database since the last update. During the publication process, the catalog database is temporarily locked so that no further modifications can be made to the catalog database until the virtual publication process is complete. A search of the catalog database is then executed as constrained by each set of rules to generate a new set of SKUs for each rule set. Each of the resulting sets of SKUs is associated with the identifier of the rule set used to generate it. The sets of SKUs resulting from this virtual publication process are then used to generate custom catalogs in different modes depending upon the type of buyer for which the custom catalog is to be generated.

In another embodiment, the buyers are coupled to the seller's catalog database through an extranet, which is a network connection established between buyer and seller over the Internet. In this embodiment, buyer's make catalog inquiries through a web browser. The inquiries are received by seller's web server application and handled by the seller's application program. In this way, the seller can directly control what data from the catalog database each buyer sees. The responses from the seller to each buyer's inquiries can therefore be limited to that set of SKUs generated using the buyer's assigned set of rules. Thus, versions of the catalog data customized for a particular buyer are essentially logical constructs; the scope of catalog data retrieved from the catalog database in response to a seller's inquiry can be can be constrained based on the rules specific to that buyer before being presented (i.e. displayed).

In another embodiment, custom versions of the catalog database are exported to external buyers not coupled to the seller's catalog database through an extranet connection. The scope of the catalog data comprising these exported custom versions are also constrained to the set of SKUs constrained by the set of rules assigned to the buyer, and generated during the virtual publication process. The difference is, the set of SKUs is used to create a complete physical manifestation of the custom version of the seller's catalog for the buyer (rather than doing so on a query by query basis as in the extranet embodiment). This physical manifestation of the buyer's custom version of the catalog data (consisting of all descriptive and attribute information for each SKU in the set) is then physically exported in its entirety to the buyer's site for incorporation.

In another embodiment, the method of generating custom catalogs is performed by program instructions of an application software program. In one embodiment, an application server executes the application program to perform the method of the invention.

The set of rules defining each custom version of the catalog is maintained independently from the catalog database. Thus, when the catalog database is modified, all custom catalogs can be updated concurrently by simply performing the virtual publishing process on the new version of the catalog database. This process involves re-running all of the searches to generate a new set of SKUs for each rule set to propagate any changes in the database that should be reflected in the custom versions of the catalog. Maintaining the rule sets used to generate a custom catalog for each buyer independently from the database also permits the rule sets to be modified for existing buyers and/or created for new buyers without affecting the catalog database. Modifications for the rule sets will also be reflected in the updated custom versions of the seller's catalog after virtual publication is complete. The rule sets that define the constraint-based searches to generate each custom catalog are then executed and the results of each search are returned in the form of a set of item SKUs the scope of which is constrained by the rules. Each buyer or buyer group is assigned to one of the rule sets.

Structure and Methodology

Referring to FIG. 1, a block-diagram representation of the apparatus for generating custom catalogs is depicted. Catalog database 10 contains the most recent version of the catalog data assembled and maintained by the seller. The catalog data stored in the database 10 is accessed through queries made to database server 9. Database server 9 can be any server capable computer, including one capable of running SQL Server 7 by Microsoft. Product or service information can be imported into database 10 via import input 24 from manufacturers and vendors of products sold by the seller. A format such as XML (extensible Mark-up Language) can be used to represent the imported data for easy manipulation and conversion.

Users authorized by the seller may be given access to the database 10 through an application program running on application server 8, which is in communication with the database server 9 through communications bus 32. The application server 8 can be any server capable computer, including a PC server capable of running the Windows NT® operating system available from Microsoft Corporation. Updates to and maintenance of database 10 can be made directly by the seller-authorized users through the application program. In one embodiment of the invention, the application server 8 communicates with database server 9 over bus 32 using TCP/IP communications protocol and JDBC/ADO database protocols.

The set of arbitrary rules used to define the scope of the subset of catalog data to be included in each custom catalog is created by seller-authorized users through terminals 38 coupled to application server 8. The rules are physically stored with (although maintained independently from) the catalog data in database 10. The search queries derived from these rules are used by the database server 9 to search and retrieve the subsets of the catalog data for each custom catalog during the publishing process. The application formulates the series of queries based on the rules and issues those queries to the database server 9. The database server 9 searches and retrieves a subset of the catalog information in the form of item SKUs in response to the queries and of a scope that is constrained by the rules.

Each set of rules is associated with a unique identifier, and each buyer for which a custom catalog is to be generated is assigned an identifier corresponding to the set of search rules that defines the scope of the content of the custom catalog for that buyer. Typically, the seller-authorized users who are charged with maintaining the database and setting up buyer accounts perform this function through terminal(s) 38. A more detailed discussion of the rules and the method of publishing the custom catalogs to various types of buyers are presented below.

FIG. 1 illustrates that customized versions of the seller's catalog data can be provided to buyers using the present invention in different modes, depending upon the type of buyer. One mode of providing customized versions of seller's catalog is employed for an extranet relationship between the seller and certain buyers. An extranet is simply a business-to-business link between the seller and one or more buyers using the Internet 40. In this case, web server 12 couples buyer-authorized and seller-authorized users to the application server 8 over the Internet 40. Thus, buyer-authorized users can access and browse the seller's catalog data directly using a computer such as a personal computer (PC) 36 running a web browser. An extranet buyer initiates catalog queries through the browser, which are received over Internet 40 by the seller's web server application. The seller services the query by way of the application running on the application server 8. The buyer's access is direct and the seller has direct control over the responses produced by the buyers' inquiries. Thus, the seller can limit the scope of any response to buyer's query simply as a function of the set of SKUs returned for that buyer during the virtual publication process. In this mode, the seller provides a virtual custom catalog for each buyer instead of having to publish a physical manifestation of some subset of the catalog data that comprises each custom version.

For the extranet, seller-authorized users can perform database maintenance either over the Internet 40 using a machine such as a PC running a web browser 38, or directly with the application server 8 as previously discussed. Both the seller and the buyer(s) authorize users to access the application running on application server 8, which is accomplished through web server 12 coupled to browsers 14 over the Internet 40. Those of skill in the art will recognize that a single server could be used to run both the application as well as the web server application. Because the buyer has direct access to the database 10 through extranet web server 12 and application server 8, updates to the virtual custom catalogs for the extranet buyers are available immediately upon completion of the publication process.

A second mode in which customized catalogs can be provided to is through the process of exportation. One context for which exportation of customized catalogs is appropriate is when a buyer offers its own catalog of products or services through its own proprietary commercial web site 11. In this case, the buyer may wish to incorporate a subset of the seller's catalog data describing products or services of the seller that the buyer wishes to sell through its web site 11. Potential purchasers of the buyer's products or services typically access the buyer's proprietary web site 11 through browsers 13 over Internet 40.

A second possible context for which exportation is applicable is a public marketplace, whereby two or more buyers establish a proprietary web site, through which they offer products or services including some of the seller's products or services. As in the previous example, proprietors of the public marketplace may wish to incorporate some subset of seller's products or services with some pricing scheme into its catalog. Customers of the public marketplace web site access the custom catalog information through browsers 18 over the Internet 40.

Another context in which exportation of customized catalog and pricing is applicable is when a seller wishes to offer some customized subset of its catalog to the many potential purchasers that belong to a private procurement network 20. Member buyers and sellers are authorized to access the procurement network, either directly using terminals 17, or indirectly through Internet 40 using browser 15.

In all of the foregoing contexts, exportation is used because the seller typically does not have direct access to the buyer's web site. Moreover, the catalog data comprising the customized subset of the catalog database often must be converted to some format of the buyer's specification prior to exportation. This could be a fairly standard format such as a version of XML, or it might be a more proprietary format in the case of a procurement network. For the foregoing contexts, because the seller typically does not have direct access to the catalog data maintained by the buyers for the foregoing contexts, the newly generated custom catalog information generated by the seller must be exported to and incorporated by the buyer. Nevertheless, the method and apparatus for generating custom catalogs can be used to create and update the exportable manifestations of custom catalogs using the same virtual publication process as applied to the extranet environment. The primary difference is how the sets of SKUs produced by the publication process are used to generate the custom catalogs. For extranet buyers, the sets of SKUs are used to constrain the results of catalog inquiries to provide a virtual custom version of the catalog for each extranet buyer. For non-extranet buyers, the sets of SKUs are used to create a complete physical manifestation of the custom catalog for exportation to the buyer.

In both the extranet context and the non-extranet context, the fact that the customized catalog for a particular buyer is a subset of the items contained in the full catalog database 10 is completely transparent to the buyers. The seller maintains the central database 24, and customized versions are virtually published to the various extranet buyers, and physical manifestations of the customized versions are exported to external buyers, based on the content rules unique to that customer.

Figure 2:
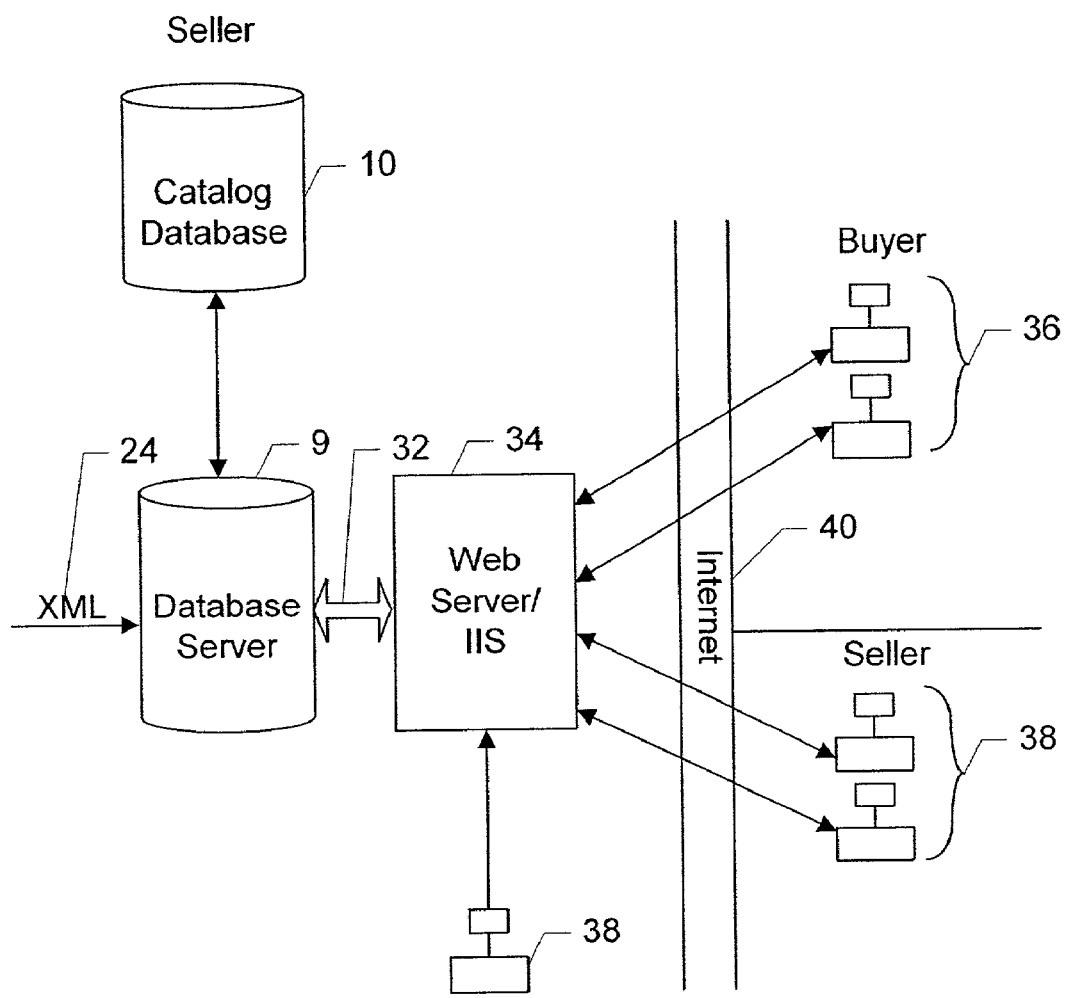
FIG. 2 shows a block diagram representation of one extranet embodiment of the method and apparatus for generating custom catalogs.

FIG. 2 illustrates one extranet embodiment of the invention. A database server 9 provides access to central catalog database 10. The database server 30 receives queries from application/web server 34 over bus 32 using an appropriate communication and database protocol such as TCP/IP and JDBC/ADO respectively. As previously discussed, the application of the present invention and the web server application can be run on the same machine. Seller-authorized users can maintain and update the catalog database 10, and create new extranet accounts with buyers using terminals 38. The seller-authorized users can access the application directly or over the Internet 40 through the web server application. New catalog data can be imported into database 10 from manufacturers, suppliers, etc. over XML import input 33. An example of an import file formatted in XML is attached hereto as Appendix A. The application/web server 34 typically runs an operating system such as Windows NT 4/IIS, available from Microsoft Corporation, or some version of Unix. A more detailed discussion of the format of the catalog data, the rules and the searches performed to create the custom catalogs follows.

Those of skill in the art will recognize that database 10 can be coupled to server 34 and to additional servers, if one desires to expand the number of extranet connections to an arbitrary number of buyers. Moreover, the rules-based re-publishing of custom catalogs can be used to customize versions of the catalog for any number of proprietary web sites, public marketplaces and procurement networks.

Figure 5A:
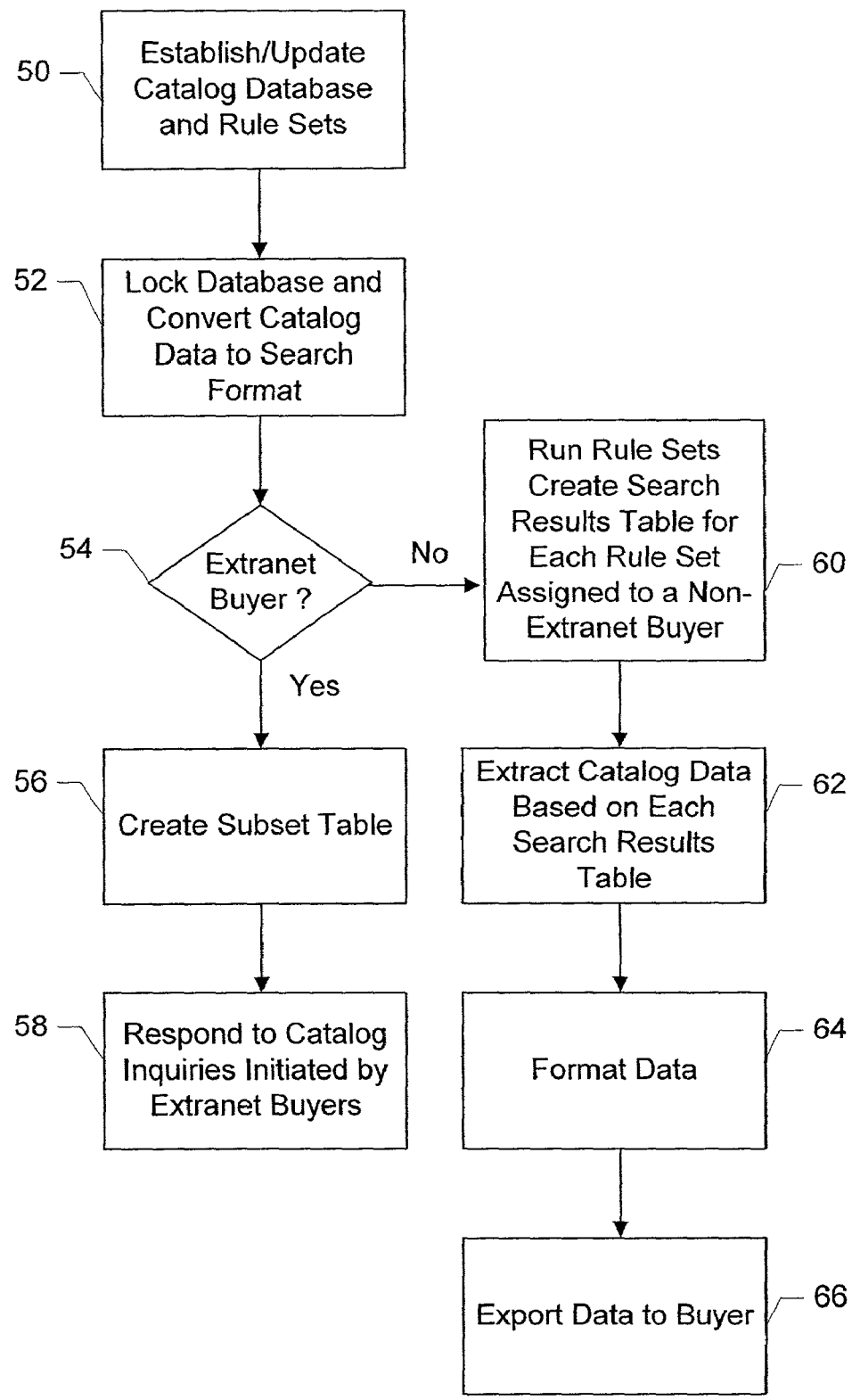
FIGS. 5a–c illustrate the procedural flow of one embodiment of the method of generating custom catalogs.
Figure 5B:
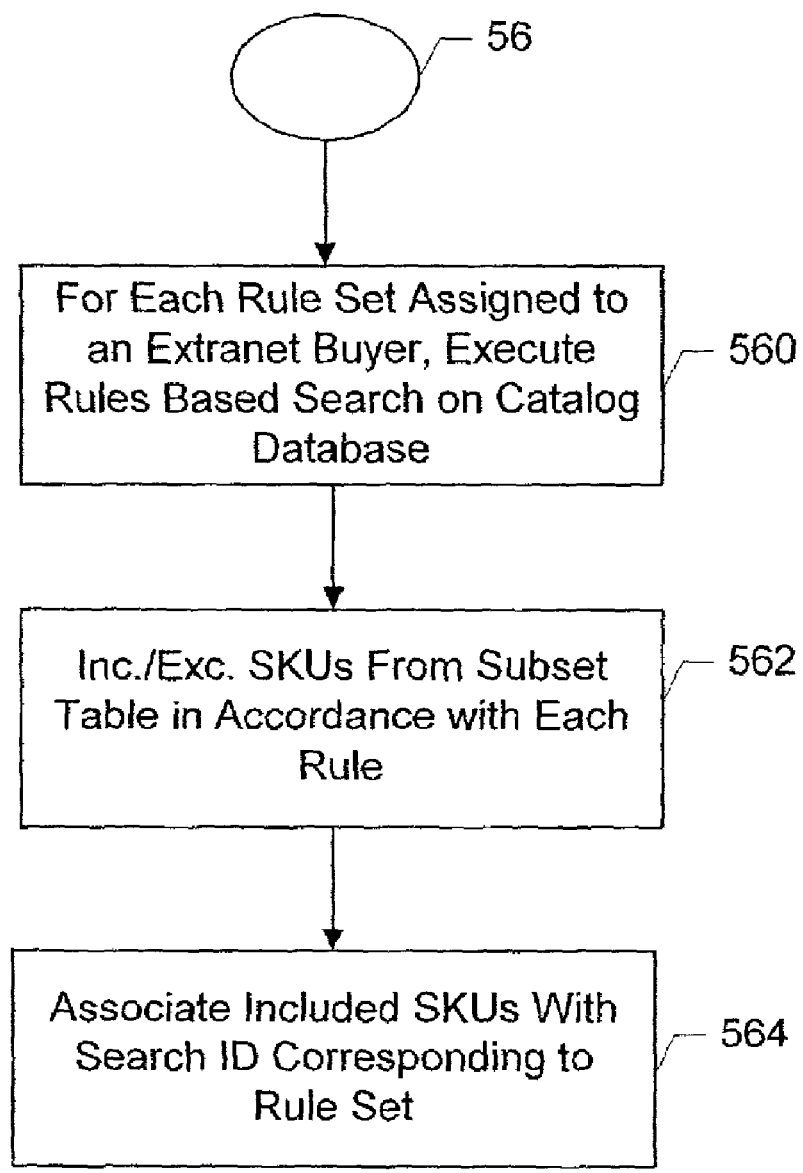
Figure 5C:
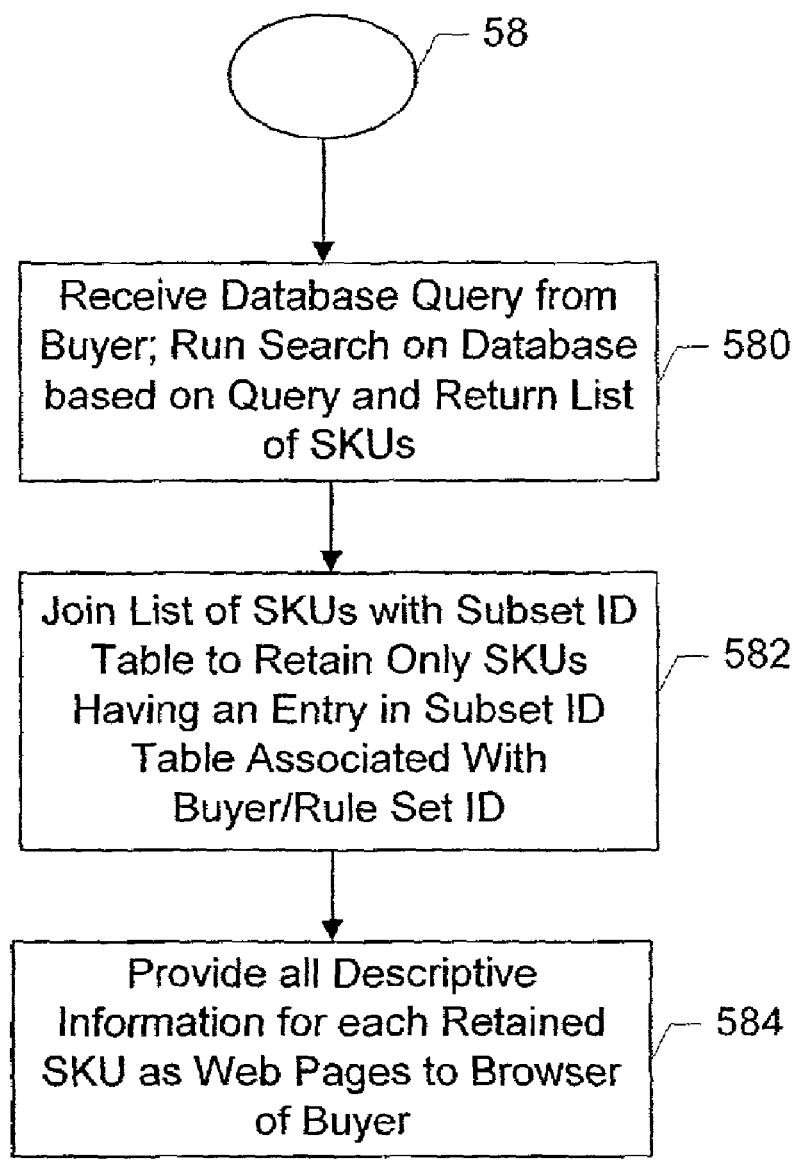

With reference to FIGS. 5a–5c, a detailed description of one embodiment of the method of generating custom catalogs is now presented. As illustrated by step 50 in FIG. 5a, the catalog database 10 is established, updated and modified through importation of vendor/supplier data and/or through direct input by seller-authorized users as previously discussed. In one embodiment, catalog data is stored in a database storage medium and can be categorized as catalog data and metadata. Catalog metadata includes product types and attributes. In one embodiment, each item is represented by a unique SKU ID (identifier) in the catalog database, and belongs to exactly one product type. Unless an attribute is one that is deliberately made common to more than one product type, each attribute belongs to exactly one product type and is identified by a unique attribute ID. Each product type is also uniquely identified with a product type ID. Those of skill in the art will recognize that the most common way to uniquely identify something in a table is with some form of alphanumeric identifier. Some examples of product type might be personal computer, memory, and hard-drive. Some examples of attributes that might be uniquely associated with such product types might be processor clock speed, memory size, vendor and capacity respectively. Catalog data typically consists of part specific data such as attribute value pairs. Examples are color=blue, size=64k, processor speed=800 MHz, etc.

FIG. 3a illustrates a simple example of how the data is arranged in the database to facilitate maintenance, and FIG.

3b illustrates how the data of FIG. 3a is transformed at the time of publication to facilitate the rules-based searching by which the catalog subsets are generated. In FIG. 3a, the data is arranged such that there is only one attribute/value per row. Thus, each item SKU as well as each product type can have multiple rows. For example, the item associated with SKU #123 has a row for each of its associated attributes. Attribute #1 (ATT#1)=vendor, ATT#2=processor clock speed, ATT#3=memory size, ATT#4= modem speed. Item SKU #123 is of product type 1=desktop computer. The item uniquely identified by SKU #321 has a row for each of its 4 attributes. ATT#5=vendor, ATT#6= print type, ATT#7=print speed, ATT#8=print resolution. Item SKU 321 is of product type= 2=printer. It should be pointed out that not all attributes must require a value, but for those that do, the application of the present invention will force a user to insert a value. Additionally, certain attributes (ATT-IDs) can be linked as common, so that searches can be performed that return, for example, all item SKUs having a value for that common attribute, regardless of product type.

Processing continues at processing step 50 where sets of rules are established for each buyer in accordance with the scope of the custom catalog that is appropriate to the particular buyer. Buyers for whom the appropriate scope is the same will be assigned to the same rule set. Each rule set is given an identifier, and each buyer is associated with a particular rule set through the identifier. In one embodiment of the present invention, rules are specified in the form of either an include (INC) or exclude (EXC), and are constrained based on product type and att/val pairs. Each rule is implicitly ANDed together with all other rules for a particular buyer. They are performed sequentially and take the general form:

```
INC/EXC
    All parts where:
        [ATT_Name op ATT_Val
        (AND) [ATT_Name opATT_Val]
        ]
``` where ATT_Name equals an attribute identifier, op is an operator {=,>,<, "starts with" or "contains"}, ATT_Val is the value of the attribute to be included or excluded, and the AND is implicit.

Thus, an example search to include all software that is manufactured by Microsoft Corporation and is related to "Windows" could be expressed as follows:

```
INC
    All parts where:
        [Product type = 'software'
        [Vendor = 'Microsoft'
            [Description "starts with" 'Windows']
        ]
        ]
```

This search would return the SKUs for products such as Windows NT®, Windows 95®, Windows 2000® operating systems or applications developed by Microsoft that are described as Windows® compatible. One could add to the search to further narrow the results by excluding all parts described as being Windows 95® compatible. Thus, one can further exclude items that have been included, or include some parts that were previously excluded. For example, one could append to the previous example to include all parts that have a vendor='Oracle.' A set of rules is created using this format for each buyer for whom the seller wishes to provide a customized catalog.

The format illustrated in FIG. 3a is designed to facilitate the creation and maintenance of the catalog data. However, it is not optimal for searching for items having certain attribute values. Thus, as illustrated by step 52 of FIG. 5a, upon commencement of publication (i.e. when new and/or updated custom catalogs are to be generated), the catalog database is locked and the data is converted to the format illustrated in FIG. 3b. A table is created for each product type, and each table comprises just one row per SKU, and a column for each attribute belonging to the product type. The tables of FIG. 3b include some additional item SKUs not shown in FIG. 3a to illustrate that other items can fall under the product type, and that each item SKU has a unique combination of the att/val pairs. The advantage to the converted format is that when a searches are performed on the data, the amount of data to be searched can is pared down first based on product type, and then by attribute/value (att/val) pairs.

It should be noted that the conversion process produces a read-only copy of the original database in the search-friendly format. Thus, the conversion process does not disturb the data in the database as configured in the maintenance-friendly format. In fact, once the format conversion process is completed, the original database is unlocked so those seller-authorized users can continue updating the catalog database without disturbing the publishing and exporting processes.

Those of skill in the art will recognize that the examples given by FIGS. 3a and 3b are for illustrative purposes only. For example, there can be an arbitrary number of product types, and an arbitrary number of attributes associated with those product types. Moreover, the alphanumeric representation of the attributes and attribute values are exemplary only, and can be expressed in any format appropriate to expressing and organizing the information in the manner described. For more information regarding the conversion of the database data from that in FIG. 3a to that of FIG. 3b, see cross-referenced U.S. patent application entitled "A Method for Building Digital Catalogs Optimized for Maintenance, Descriptiveness, And Fast Search."

Processing continues at step 54, where if there are extranet buyers established and recognized by the application, processing continues to step 56 where searches are performed on the transformed version of the catalog database for each set of rules identified by the application. Searches are structured based on rules that define what should be viewable to each buyer from the entire database.

Referring to FIG. 5b, the details of processing step 56 are illustrated. At processing step 560, each rule set is executed as a series of sequential searches on the catalog database. With each rule in a rule set defining a search. At processing steps 562 and 564, each time an "include" rule is executed, a row is added to a subset table for each SKU returned by the search. The row contains a column entry for the SKU and another column entry containing the identifier assigned to the rule set being executed. Each time an EXCLUDE rule is executed, any SKUs returned by the search having an entry in the subset table are deleted. Processing continues at step 56 until the rule sets for all extranet buyers has been performed and thus the subset table has been completed.

FIG. 4 illustrates one possible example of a subset table generated from the catalog database data reflected in FIG. 3b by one extranet embodiment of the present invention. The first subset might have been returned for a first search associated with a buyer organization denoted by subset ID=001. The search rules might have been to include all parts where product type=desktop computer and vendor=Compaq, or the rule might have been to exclude all parts where the product type=desktop computer and vendor=Dell. The search for subset=002 might have been to include all parts where product type=desktop computers, or include all parts where product type=desktop computers and modem speed= 56k. The search for subset=003 might have been to include all parts where product type= desktop computers and all parts where product type=printers.

Once all extranet rule set searches have been completed, the subset table contains a set of SKU entries for each rule set that consists of the subset of the catalog database comprising a custom catalog the scope of which is defined by the specific rule set used to generate it. Processing then continues at step 58, wherein catalog queries from authorized users of any extranet buyer may be initiated through a web browser, which are communicated over the Internet to the web server application, which then presents the query along with the buyer's identification to the catalog publishing application. The buyer's identification corresponds to the rule set that governs which custom catalog subset is appropriate for that buyer.

The query from the buyer could be for example, to include all items. In this case, the application issues the request to the database server, which first retrieves and returns all SKUs in the catalog database, corresponding to processing step 580 of FIG. 5c. The database server then performs a join to the subset table to determine which of the retrieved SKUs also has an entry associated in the subset table for the buyer's identifier. The database server than returns all SKUs from the catalog database that also are found with an entry in the subset table along with the appropriate rule set (or search) ID. This step corresponds to processing step 582 of FIG. 5c. In this simple example, the entire custom catalog for that buyer is returned. Along with the returned SKUs, the database server also returns all associated descriptive information for each of the items identified with the SKUs. The application in turn presents the information to the web server, which in turn provides the pages of catalog data to the user's browser for display on the user's computer. This step is represented by step 584 of FIG. 5c.

In one embodiment, upon successful access to the web server application through a password or other known technique for restricting such access, the buyer-authorized user is presented with one or more web pages concerning the catalog. These web pages are designed to facilitate the user's browsing of the custom catalog and the formulation of browsing queries based on a user-friendly browsing hierarchy. To be effective, such a user-friendly browsing hierarchy must be cognizant of the customized scope of the particular custom catalog for a given buyer. Such a browsing hierarchy is disclosed in cross-referenced U.S. patent application entitled "Display Catalog with Constraint Based Hierarchy and Propagation Features."

Referring back to decision step 54, if non-extranet buyers have also been identified, processing for those buyers proceeds at processing step 60. At step 60, searches are run on the catalog database for all of the rule sets assigned to non-extranet buyers in virtually the same manner as at processing step 56. One difference is that separate catalog subset tables are created for each of the rule sets assigned to non-extranet buyers. Processing then continues at processing step 62, where catalog data, including all descriptive information associated with each item SKU, is extracted from the catalog database for all SKUs in each catalog subset table. In essence, a complete copy of the catalog subset is created for each rule set assigned to a non-extranet buyer. This must be done because, unlike the extranet buyer, the non-extranet buyers are not directly coupled to the catalog database. Finally, at step 64 a copy of the extracted catalog data is then created and formatted for each non-extranet buyer assigned to the rule set from which the extracted data has been generated, and at step 66 formatted copy of the extracted catalog data is then exported to the non-extranet buyer's web site at step 66. The extracted catalog subset can be provided in an XML format, or it can be converted to the buyer's format during step 64. Typically, a procurement network has its own standard format to which the subset of the catalog data must be converted. The procurement network proprietor may specify that the customized subset generated at step 62 to be formatted in some intermediate format, which the proprietor can then convert to the format of the network.

Figure 6A:
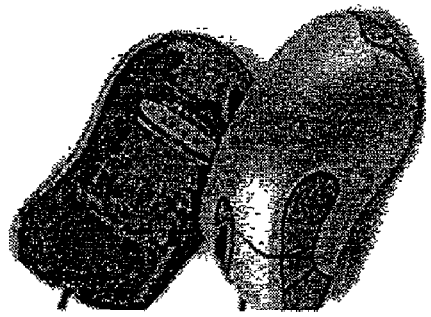
FIGS. 6a–h are browser screen shots, displayed to a seller-authorized user, illustrating one embodiment of a browser interface by which rule sets defining custom catalogs may be created.
Figure 6B:
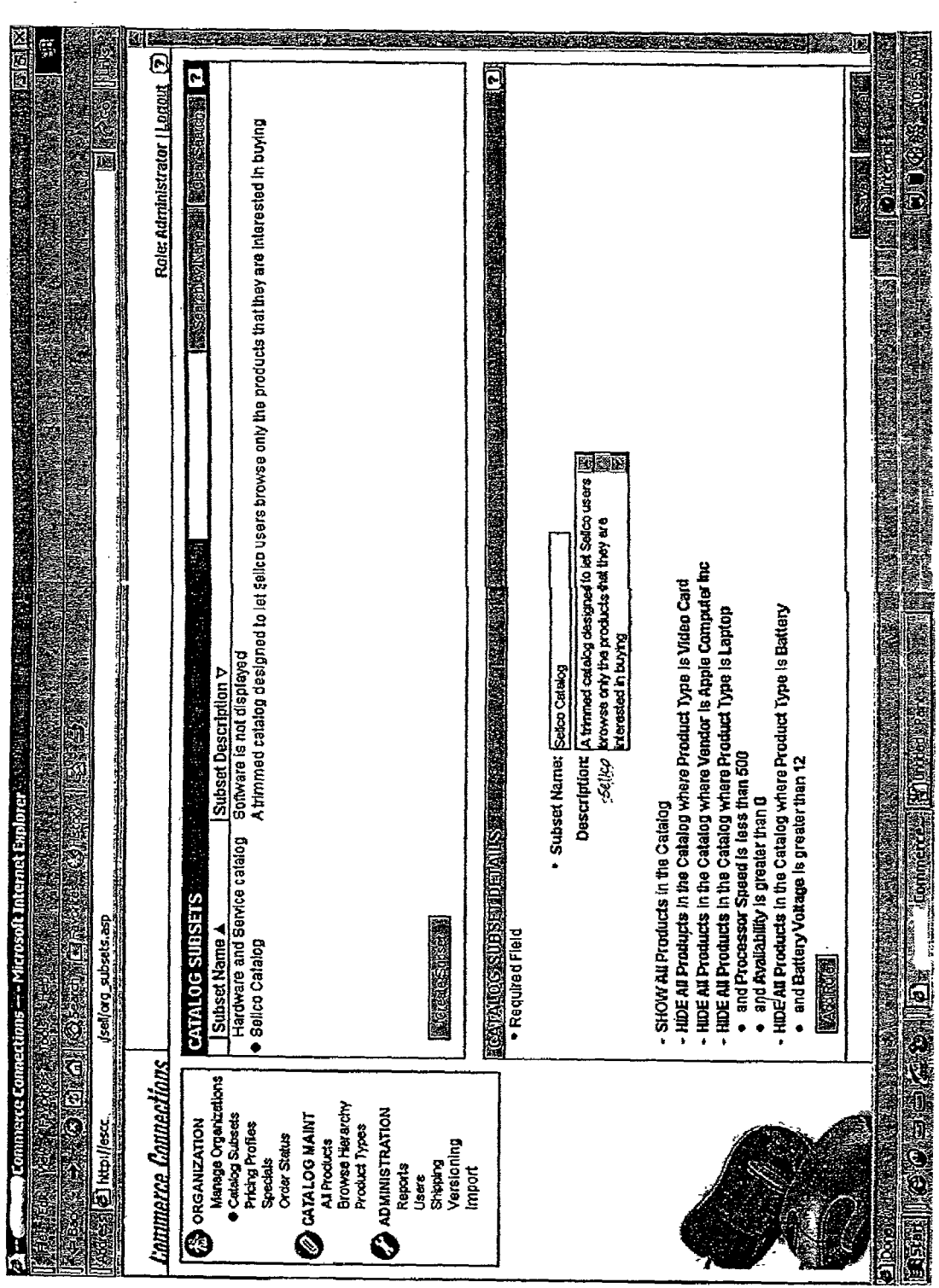
Figure 6C:
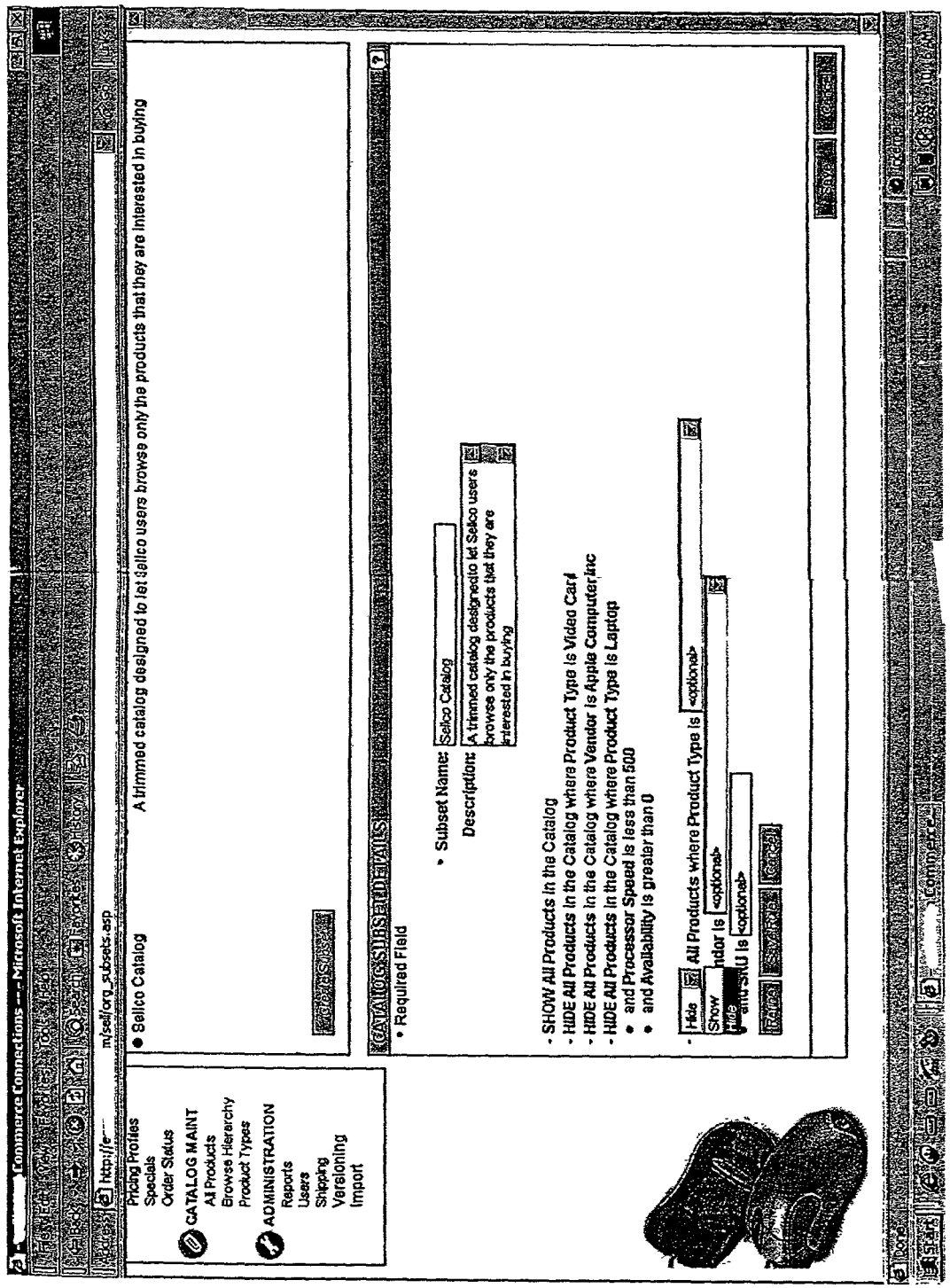
Figure 6D:
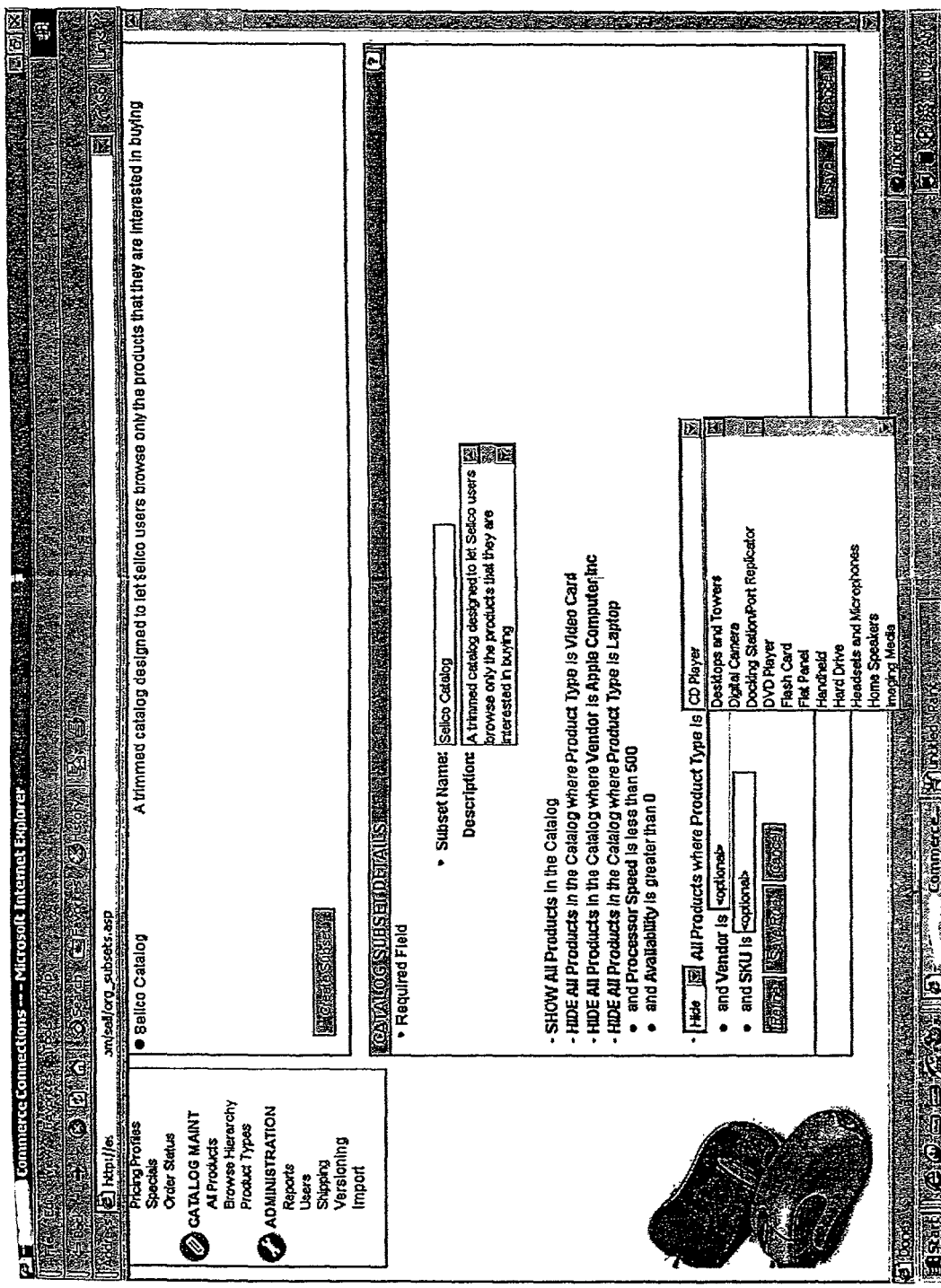
Figure 6E:
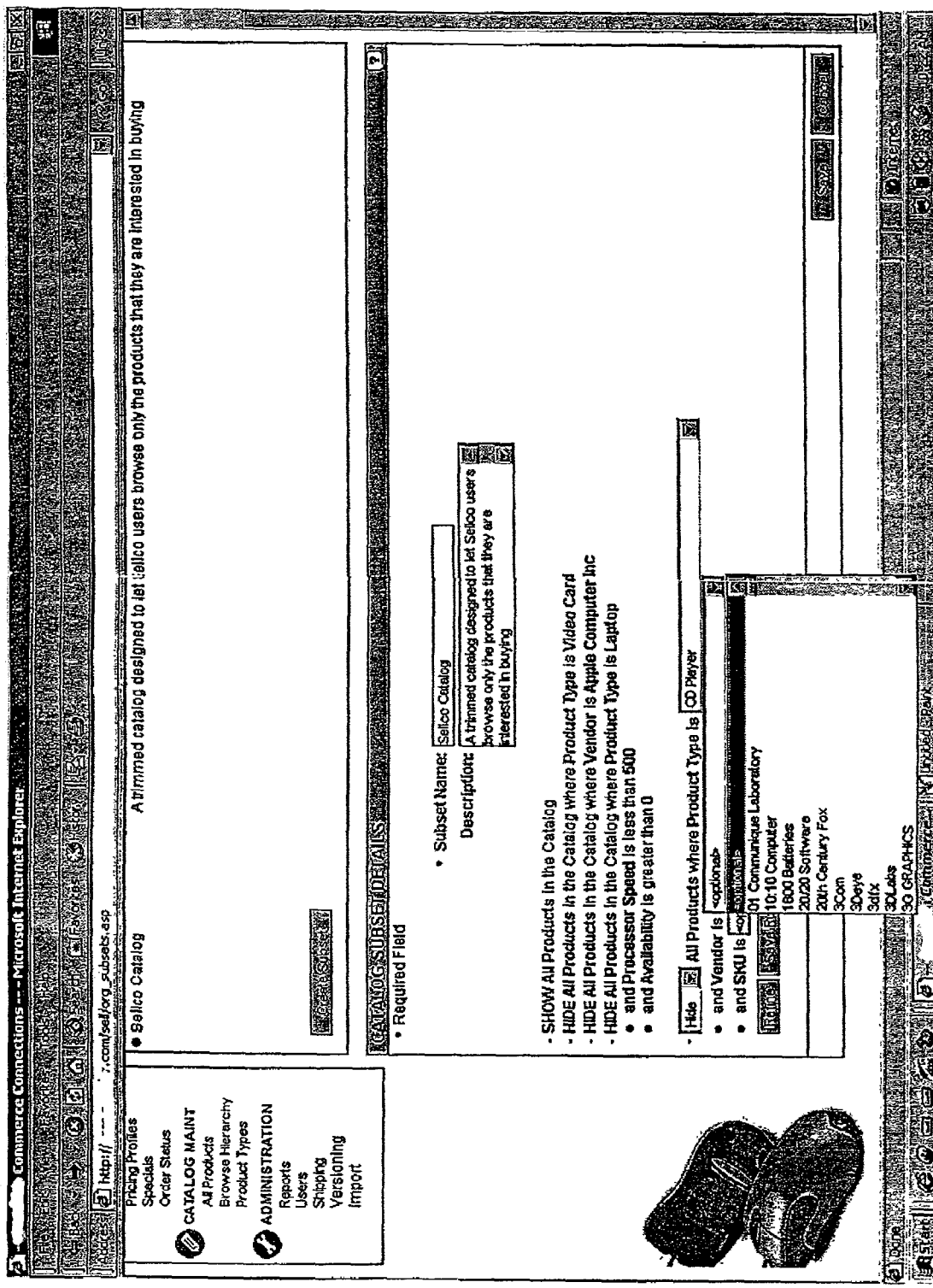
Figure 6F:
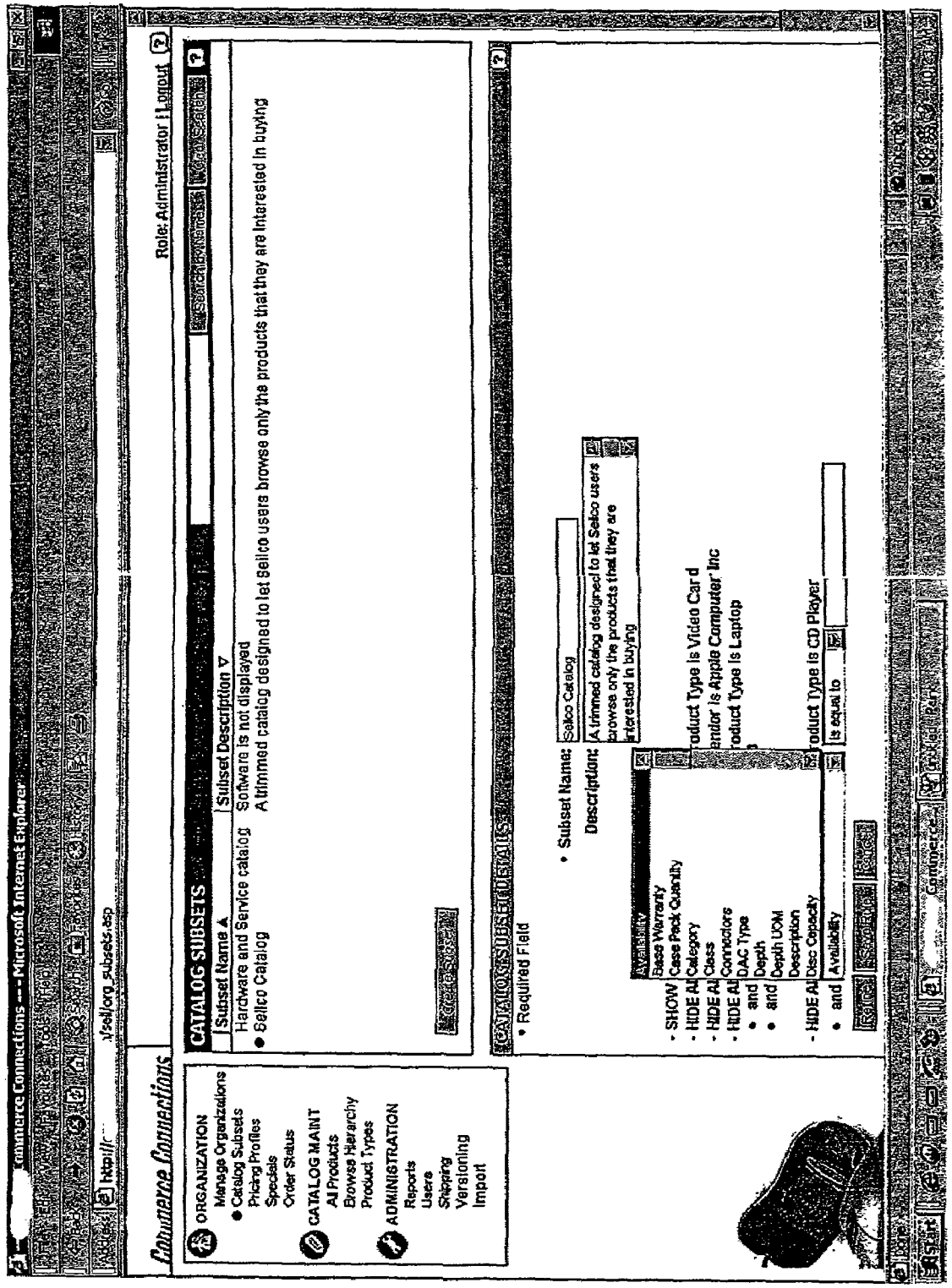
Figure 6G:
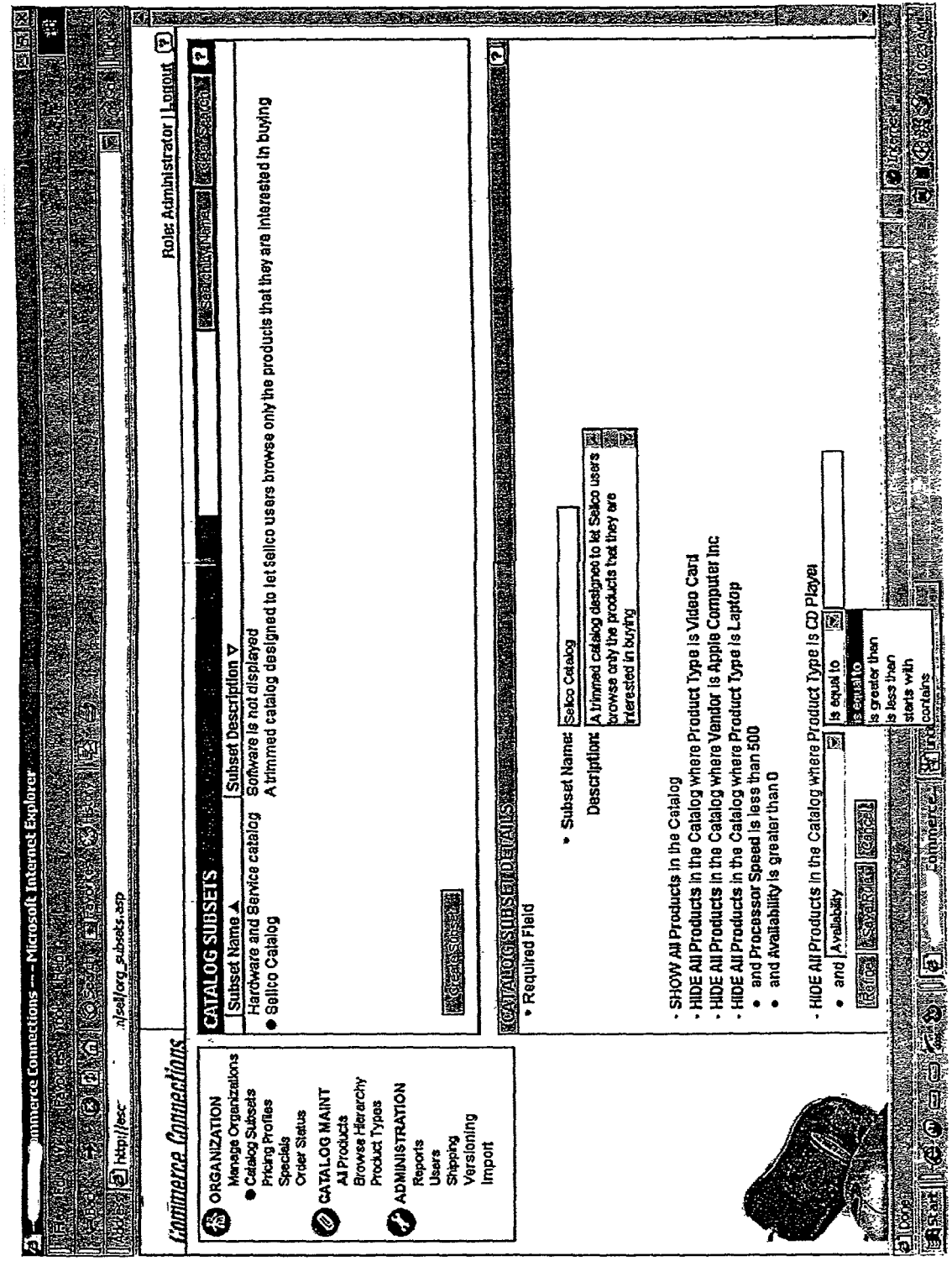
Figure 6H:
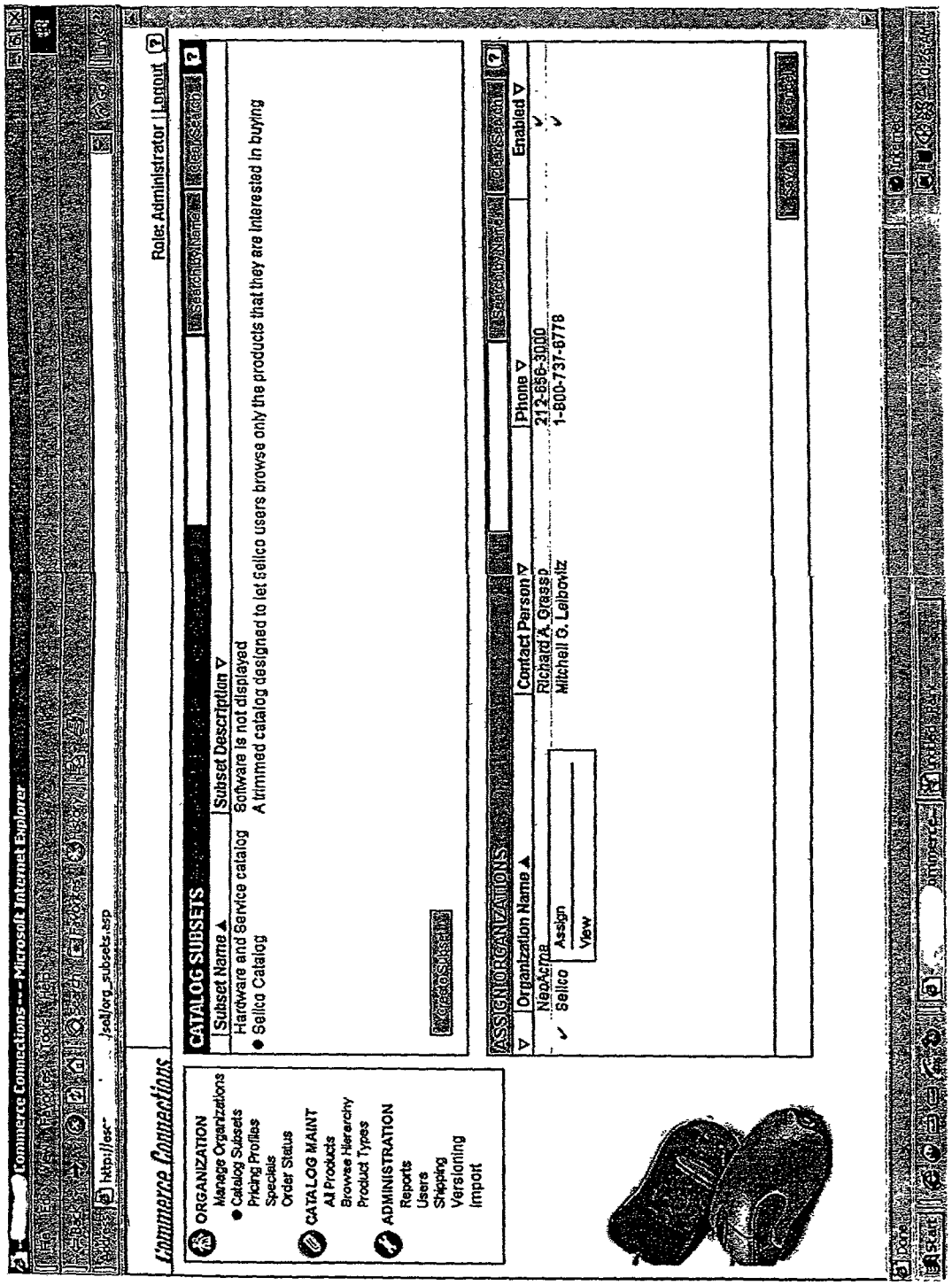

FIGS. 6a–6h illustrate screen shots produced by the application on a seller-authorized user's web browser by which a rule set is developed for a fictitious extranet buyer or list of buyers called Sellco, the process which is initiated by activating the "Create Subset" button as shown in FIG. 6a. In this case, FIG. 6a illustrates that a catalog subset has already been created for Sellco. By selecting Sellco and catalog subsets, the Sellco rule set is displayed in FIG. 6b. The terms "Show" and "Hide" are used interchangeably with the terms "Include" and "Exclude" as used hereinabove. To add to the rule set already created, the user selects the "Add Rule" button as shown on FIG. 6b. FIG. 6c shows the first option for creating the rule is to select between "Hide" or "Show" to create the next rule. FIG. 6d shows that "Hide" was selected, and now a product type is selected from the drop-down list box, from which "CD Player" is selected. FIG. 6e illustrates that a Vendor attribute can be optionally selected from the drop down list. FIG. 6f illustrates that upon activating (i.e. clicking on) the "Refine" button, additional attributes unique to the product type can also be selected from a drop down list. FIG. 6g illustrates that the "Availability" attribute has been chosen, and the attribute operator can be selected from a drop down list and a value inserted in the text box to the right of the operator. Finally, FIG. 6h illustrates that another buyer can be associated with a set of rules.

Those of skill in the art will recognize that regardless of whether the custom catalog subsets are provided to buyers through export to offline web sites or procurement networks, or directly through on-line extranets, the method and apparatus of the present invention makes it far easier on the seller to publish custom catalogs for its various buyers. The seller need only create and maintain a common catalog database in one physical location that represents the superset all available goods/services offered by the seller. The seller then simply establishes a set of rule based searches, one for each buyer or buyer organization, and then generates the custom subset of the superset by executing the searches and returning a set of SKUs for each buyer. If the database is updated, the seller need only run the established sets of rules to publish updated custom catalogs for each buyer. If the relationship between seller and buyer evolves and requires a different scope of products or services to be included in that buyer's catalog, only the set of rules needs to be altered, at which point the buyer's catalog is simply regenerated using the same database.

The above embodiments illustrate but do not limit the invention. In particular, the invention is neither limited by the types of computers used as servers, nor the operating systems, web server or database server application software running on such servers. The invention is limited neither by the types of user terminals used to connect to the servers, nor the type of browser software resident on the terminals. The invention is neither limited by the structure of the data as stored in the database, nor is it limited by the nomenclature used in identifying data types and attributes. The invention does not have to be implemented using the Internet, but rather may be implemented over any network, using any type of transmission protocol and display formats. Those of skill in the art will recognize that while a single centrally maintained catalog database is illustrated, one could have a number of databases or other partitioning of the data from which the custom catalogs could be generated without exceeding the intended scope of the invention.

In addition, while the invention is illustrated in the disclosed embodiments as a centrally maintained catalog subset for a seller, those of skill in the art will recognized that it may also be used by, for example, a large buyer maintaining a database of desired requisition items. A number of suppliers could be authorized to respond to some subset of such requests by the buyer, and the invention could be used to constrain the various requests for materials or services seen by any particular supplier.

Finally, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. Other embodiments and variations are within the scope of the invention, as defined by the appended claims.

What is claimed is:

1. A method of using one or more computer systems to generate a plurality of custom catalogs from a database comprising catalog data, said method comprising:
    executing a search of the database for each of a plurality of rule sets, each of the rule sets specifying constraints that define a scope of the catalog data comprising one of the custom catalogs, and each of the rule sets uniquely identified by a rule set identifier, said executing a search performed in accordance with constraints specified by the rule set and returning a set of search results in the form of a subset of the catalog data having the scope defined by the constraints;
    associating each set of search results with the identifier of the rule set used to generate them; and
    responding to a database query, the query specifying constraints defining a scope of the catalog data and being associated with a rule set identifier, wherein said responding further comprises:
        executing a search of the database in accordance with the query constraints, the search returning a set of query results in the form of a subset of the catalog data having the scope defined by the query constraints; and
        generating a response to the query that comprises a pared subset of the catalog data that forms the intersection between the set of query results and the set of search results associated with the same rule set identifier as associated with the query.

2. The method of claim 1 further comprising receiving the query from a browser over the Internet.

3. The method of claim 2 wherein said generating a response to the query further comprises:
    formatting the pared subset of catalog data as one or more web pages; and
    transmitting the web pages over the Internet for display on the browser.

4. The method of claim 1 wherein the catalog data represents a plurality of items, the catalog data for each of the items comprising a unique item identifier, one or more attributes, a unique value for each of the attributes, and associated descriptive information.

5. The method of claim 4 wherein each set of search results comprises none, one or more item identifiers, and wherein said associating further comprises:
    for each set of search results,
        creating an entry in a subset table for each instance of the one or more item identifiers in the set; and
        storing in each entry the item identifier and the identifier of the rule set used to constrain the search that generated the set.

6. The method of claim 5 further comprising responding to a database query, the query specifying constraints defining a scope of the catalog data and being associated with a rule set identifier, said responding further comprising:
    executing a search of the database in accordance with the query constraints, the search returning a set of query results in the form of a subset of the catalog data having the scope defined by the query constraints, the query results comprising none, one or more item identifiers;
    creating a query results table having an entry for each item identifier in the set of query results, each entry storing the item identifier with the rule set identifier associated with the query;
    performing a table join between the query results table and the subset table and returning a pared subset comprising all item identifiers that have identical entries in both tables; and
    generating a response to the query that includes descriptive information associated with each of the item identifiers included in the pared subset.

7. The method of claim 1 further comprising storing each of one or more sets of search results in a different catalog subset table, each catalog subset table associated with the identifier of the rule set constraining the search used to generate the set of results stored therein.

8. The method of claim 7 wherein the catalog data represents a plurality of items, the catalog data for each of the items comprising a unique item identifier, one or more attributes, a unique value for each of the attributes, and associated descriptive information.

9. The method of claim 8 wherein each of the catalog subset tables comprises one or more item identifiers for each of the items included in the set of search results stored in each table, said method further comprising for each catalog subset table, extracting the catalog data for each of the item identifiers stored therein to create a custom catalog file.

10. The method of claim 9 further comprising:
    formatting one or more copies of the custom catalog files; and
    exporting each formatted copy to an entity associated with the same identifier as the identifier associated with the rule set constraining the search used to generate the search results used to extract the catalog data comprising the formatted copy to be exported.

11. The method of claim 1 further comprising:
    locking the database so that no modifications can be made to the database during said executing searches;

creating a read-only copy of the database; and
wherein said executing a search is performed on the read-only copy of the database.

12. The method of claim 11 wherein said creating a read only copy of the database further comprises converting the database from format that facilitates database maintenance to a read-only version of the database having a format that facilitates searches.

13. The method of claim 1 wherein said executing a search further comprises:
translating the rule sets to database queries;
issuing the database queries to a database server coupled to the database; and
wherein the database server executes the searches of the database in accordance with the database queries.

14. The method of claim 13 wherein said converting the rule sets to database queries is performed by an application program being executed on an application server.

15. The method of claim 1 wherein the rule sets comprise one or more rules, each of the rules specifying an include or an exclude function in conjunction with one or more item attribute pairs.

16. The method of claim 1 further comprising establishing the plurality of rule sets using a browser interface to an application program being executed on an application server.

17. An apparatus comprising one or more computers for generating a plurality of custom catalogs from a database comprising catalog data, said apparatus comprising:
means for executing a search of the database for each of a plurality of rule sets, each of the rule sets specifying constraints that define a scope of the catalog data comprising one of the custom catalogs, and each of the rule sets uniquely identified by a rule set identifier, said executing a search performed in accordance with constraints specified by the rule set and returning a set of search results in the form of a subset of the catalog data having the scope defined by the constraints;
means for associating each set of search results with the identifier of the rule set used to generate them; and
means for responding to a database query, the query specifying constraints defining a scope of the catalog data and being associated with a rule set identifier, said means for responding further comprising:
means for executing a search of the database in accordance with the query constraints the search returning a set of query results in the form of a subset of the catalog data having the scope defined by the query constraints; and
means for generating a response to the query that comprises a pared subset of the catalog data that forms the intersection between the set of query results and the set of search results associated with the same rule set identifier as associated with the query.

18. The apparatus of claim 17 further comprising receiving the query from a browser over the Internet.

19. The apparatus of claim 18 wherein said means for generating a response to the query further comprises:
means for formatting the pared subset of catalog data as one or more web pages; and
means for transmitting the web pages over the Internet for display on the browser.

20. The apparatus of claim 17 wherein the catalog data represents a plurality of items, the catalog data for each of the items comprising a unique item identifier, one or more attributes, a unique value for each of the attributes, and associated descriptive information.

21. The apparatus of claim 20 wherein each set of search results comprises none, one or more identifiers, and wherein said means for associating further comprises:
means for creating for each set of search results an entry in a subset table for each instance of the one or more item identifiers in the set; and
means for storing in each entry the item identifier and the identifier of the rule set used to constrain the search that generated the set, for each set of search results.

22. The apparatus of claim 21 further comprising means for responding to a database query, the query specifying constraints defining a scope of the catalog data and being associated with a rule set identifier, said means for responding further comprising:
means for executing a search of the database in accordance with the query constraints, the search returning a set of query results in the form of a subset of the catalog data having the scope defined by the query constraints, the query results comprising none, one or more item identifiers;
means for creating a query results table having an entry for each item identifier in the set of query results, each entry storing the item identifier with the same rule set identifier as associated with the query;
means for performing a table join between the query results table and the subset table and returning a pared subset comprising all item identifiers that have identical entries in both tables; and
means for generating a response to the query that includes descriptive information associated with each of the item identifiers included in the pared subset.

23. The apparatus of claim 17 further comprising means for storing each of one or more sets of search results in a different catalog subset table, each catalog subset table associated with the identifier of the rule set constraining the search used to generate the set of results stored therein.

24. The apparatus of claim 23 wherein the catalog data represents a plurality of items, the catalog data for each of the items comprising a unique item identifier, one or more attributes, a unique value for each of the attributes, and associated descriptive information.

25. The apparatus of claim 24 wherein each of the catalog subset tables comprises one or more item identifiers for each of the items included in the set of search results stored in each table, said apparatus further comprising, means for extracting for each catalog subset table the catalog data for each of the item identifiers stored therein to create a custom catalog file.

26. The apparatus of claim 25 further comprising:
means for formatting one or more copies of the custom catalog files; and
means for exporting each formatted copy to an entity associated with the same identifier as the identifier associated with the rule set constraining the search used to generate the search results used to extract the catalog data comprising the formatted copy to be exported.

27. The apparatus of claim 17 further comprising:
means for locking the database so that no modifications can be made to the database during said executing searches;
means for creating a read-only copy of the database; and
wherein said means for executing searches operates on the read-only copy of the database.

28. The apparatus of claim 17 wherein said means for creating a read only copy of the database further comprises means for converting the database from format that facilitates database maintenance to a read-only version of the database having a format that facilitates searches.

29. The apparatus of claim 17 wherein said means for executing a search further comprises:
   means for translating the rule sets to database queries;
   means for issuing the database queries to a database server coupled to the database; and
   wherein the database server executes the searches of the database in accordance with the database queries.

30. The apparatus of claim 29 wherein said means for converting the rule sets to database queries is performed by an application program being executed on an application server.

31. The apparatus of claim 17 wherein the rule sets comprise one or more rules, each of the rules specifying an include or an exclude function in conjunction with one or more item attribute pairs.

32. The apparatus of claim 17 further comprising means for establishing the plurality of rule sets using a browser interface to an application program being executed on an application server.

33. A computer program product for generating a plurality of custom catalogs from a database comprising catalog data, said computer program product comprising:
   a computer-readable storage medium; and
   program instructions stored on said storage medium for:
      executing a search of the database for each of a plurality of rule sets, each of the rule sets specifying constraints that define a scope of the catalog data comprising one of the custom catalogs, and each of the rule sets uniquely identified by a rule set identifier, said executing a search performed in accordance with constraints specified by the rule set and returning a set of search results in the form of a subset of the catalog data having the scope defined by the constraints;
      associating each set of search results with the identifier of the rule set used to generate them;
      responding to a database query, the query specifying constraints defining a scope of the catalog data and being associated with rule set identifier;
      executing a search of the database in accordance with the query constraints, the search returning a set of query results in the form of a subset of the catalog data having the scope defined by the query constraints; and
      generating a response to the query that comprises a pared subset of the catalog data that forms the intersection between the set of query results and the set of search results associated with the same rule set identifier as associated with the query.

34. The computer program product of claim 33 wherein said program instructions are further for receiving the query from a browser over the Internet.

35. The computer program product of claim 34 wherein said program instructions are further for:
   formatting the pared subset of catalog data as one or more web pages; and
   transmitting the web pages over the Internet for display on the browser.

36. The computer program product of claim 33 wherein the catalog data represents a plurality of items, the catalog data for each of the items comprising a unique item identifier, one or more attributes, a unique value for each of the attributes, and associated descriptive information.

37. The computer program product of claim 36 wherein each set of search results comprises none, one or more item identifiers, wherein said program instructions are further for:
   for each set of search results,
   creating an entry in a subset table for each instance of the one or more item identifiers in the set; and
   storing in each entry the item identifier and the identifier of the rule set used to constrain the search that generated the set.

38. The computer program product of claim 37 wherein said program instructions are further for responding to a database query, the query specifying constraints defining a scope of the catalog data and being associated with a rule set identifier, said program instructions further for:
   executing a search of the database in accordance with the query constraints, the search returning a set of query results in the form of a subset of the catalog data having the scope defined by the query constraints, the query results comprising none, one or more item identifiers;
   creating a query results table having an entry for each item identifier in the set of query results, each entry storing the item identifier with the same rule set identifier as associated with the query;
   performing a table join between the query results table and the subset table and returning a pared subset comprising all item identifiers that have identical entries in both tables; and
   generating a response to the query that includes descriptive information associated with each of the item identifiers included in the pared subset.

39. The computer program product of claim 33 wherein said program instructions are further for storing each of one or more sets of search results in a different catalog subset table, each catalog subset table associated with the identifier of the rule set constraining the search used to generate the set of results stored therein.

40. The computer program product of claim 39 wherein the catalog data represents a plurality of items, the catalog data for each of the items comprising a unique item identifier, one or more attributes, a unique value for each of the attributes, and associated descriptive information.

41. The computer program product of claim 40 wherein each of the catalog subset tables comprises one or more item identifiers for each of the items included in the set of search results stored in each table, and wherein said program instructions are further for:
   extracting, for each catalog subset table, the catalog data for each of the item identifiers stored therein to create a custom catalog file.

42. The computer program product of claim 41 wherein said program instructions are further for:
   formatting one or more copies of the custom catalog files; and
   exporting each formatted copy to an entity associated with the same identifier as the identifier associated with the rule set constraining the search used to generate the search results used to extract the catalog data comprising the formatted copy to be exported.

43. The computer program product of claim 33 wherein said program instructions are further for:
   locking the database so that no modifications can be made to the database during said executing searches;
   creating a read-only copy of the database; and
   wherein said executing searches is performed on the read-only copy of the database.

44. The computer program product of claim 43 wherein said program instructions are further for converting the database from a format that facilitates database maintenance to a read-only version of the database having a format that facilitates searches.

45. The computer program product of claim 33 wherein said program instructions are further for:
translating the rule sets to database queries;
issuing the database queries to a database server coupled to the database; and
wherein the database server executes the searches of the database in accordance with the database queries.

46. The computer program product of claim 45 wherein said program instructions comprise an application program being executed on an application server.

47. The computer program product of claim 33 wherein the rule sets comprise one or more rules, each of the rules specifying an include or an exclude function in conjunction with one or more item attribute pairs.

48. A custom catalog generated from a database comprising catalog data, said custom catalog generated by using one or more computers to perform steps comprising:
executing a search of the database for each of a plurality of rule sets, each of the rule sets specifying constraints that define a scope of the catalog data comprising one of the custom catalogs, and each of the rule sets uniquely identified by a rule set identifier, said executing a search performed in accordance with constraints specified by the rule set and returning a set of search results in the form of a subset of the catalog data having the scope defined by the constraints;
associating the set of search results with the identifier of the rule set;
responding to a database query, the query specifying constraints defining a scope of the catalog data and being associated with a rule set identifier;
executing a search of the database in accordance with the query constraints, the search returning a set of query results in the form of a subset of the catalog data having the scope defined by the query constraints; and
generating a response to the query that comprises a pared subset of the catalog data forming the intersection between the set of query results and the set of search results.

49. The custom catalog of claim 48 further generated by receiving the query from a browser over the Internet.

50. The custom catalog of claim 49 further generated by:
formatting the pared subset of catalog data as one or more web pages; and
transmitting the web pages over the Internet for display on the browser.

51. The custom catalog of claim 48 wherein the catalog data represents a plurality of items, the catalog data for each of the items comprising a unique identifier, one or more attributes, a unique value for each of the attributes, and associated descriptive information.

52. The custom catalog of claim 51 wherein the set of search results comprises none, one or more item identifiers, and wherein said custom catalog is further generated by:
creating an entry in a subset table for each instance of the one or more item identifiers in the set; and
storing in each entry the item identifier and the identifier of the rule set.

53. The custom catalog of claim 52 further generated by responding to a database query, the query specifying constraints defining a scope of the catalog data and being associated with a rule set identifier, said custom catalog further generated by:
executing a search of the database in accordance with the query constraints, the search returning a set of query results in the form of a subset of the catalog data having the scope defined by the query constraints, the query results comprising none, one or more item identifiers;
creating a query results table having an entry for each item identifier in the set of query results, each entry storing the item identifier with the rule set identifier associated with the query;
performing a table join between the query results table and the subset table and returning a pared subset comprising all item identifiers that have identical entries in both tables; and
generating a response to the query that includes descriptive information associated with each of the item identifiers included in the pared subset.

54. The custom catalog of claim 48 further generated by storing the set of search results in a catalog subset table, each catalog subset table associated with the identifier.

55. The custom catalog of claim 54 wherein the catalog data represents a plurality of items, the catalog data for each of the items comprising a unique item identifier, one or more attributes, a unique value for each of the attributes, and associated descriptive information.

56. The custom catalog of claim 55 wherein the catalog subset table comprises one or more item identifiers for each of the items included in the set of search results stored in the table, said custom catalog further generated by extracting the catalog data for each of the item identifiers stored therein to create a custom catalog file.

57. The custom catalog of claim 56 further generated by:
formatting one or more copies of the custom catalog file; and
exporting each formatted copy to an entity associated with the identifier of the rule set.

58. The custom catalog of claim 48 further generated by:
locking the database so that no modifications can be made to the database during said executing searches;
creating a read-only copy of the database; and
wherein said executing searches is performed on the read-only copy of the database.

59. The custom catalog of claim 58 further generated by converting the database from a format that facilitates database maintenance to a read-only version of the database having a format that facilitates searches.

60. The custom catalog of claim 48 further generated by:
translating the rule set to one or more database queries;
issuing the database queries to a database server coupled to the database; and
wherein the database server executes the search of the database in accordance with the database queries.

61. The custom catalog of claim 60 wherein said custom catalog is generated by an application program being executed on an application server.

62. The custom catalog of claim 48 wherein the rule sets comprise one or more rules, each of the rules specifying an include or an exclude function in conjunction with one or more item attribute pairs.

63. The custom catalog of claim 48 further generated by using a browser interface to an application program being executed on an application server to establish a plurality of rule sets.

\* \* \* \* \*